(12) United States Patent
Park et al.

(10) Patent No.: US 9,910,330 B2
(45) Date of Patent: Mar. 6, 2018

(54) DISPLAY PANEL AND METHOD OF MANUFACTURING THE SAME

(71) Applicant: SAMSUNG DISPLAY CO., LTD., Yongin, Gyeonggi-Do (KR)

(72) Inventors: Chul-Won Park, Gwangmyeong-si (KR); Hoon Kang, Suwon-si (KR); Koichi Sugitani, Hwaseong-si (KR); Jin-Ho Ju, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 92 days.

(21) Appl. No.: 14/663,358

(22) Filed: Mar. 19, 2015

(65) Prior Publication Data

US 2016/0131952 A1   May 12, 2016

(30) Foreign Application Priority Data

Nov. 7, 2014   (KR) .................. 10-2014-0154716

(51) Int. Cl.
*G02F 1/1341* (2006.01)
*G02F 1/1362* (2006.01)
(Continued)

(52) U.S. Cl.
CPC ...... *G02F 1/136227* (2013.01); *G02F 1/1339* (2013.01); *G02F 1/1341* (2013.01);
(Continued)

(58) Field of Classification Search
CPC ......... G02F 1/136227; G02F 1/133512; G02F 1/133514; G02F 1/1339; G02F 1/136286;
(Continued)

(56) References Cited

U.S. PATENT DOCUMENTS 7,843,543 B2 * 11/2010 Jeon .................. G02F 1/134363
349/141
8,310,612 B2 * 11/2012 Cho .................. G02F 1/136227
349/138
(Continued)

FOREIGN PATENT DOCUMENTS

KR   10-2005-0066589 A   6/2005
KR   10-2009-0088575 A   8/2009
(Continued)

*Primary Examiner* — Angela Davison
(74) *Attorney, Agent, or Firm* — Lewis Rocca Rothgerber Christie LLP (57) ABSTRACT

In a display panel, a thin film transistor is connected to a gate line and a data line, and includes a gate electrode, a semiconductor pattern, a source electrode and a drain electrode. An organic pattern makes contact with a side surface of the data line and a side surface of the thin film transistor, and the organic pattern overlaps pixel areas of the display panel. A first passivation layer is on the data line, the thin film transistor and the organic pattern. A common electrode is on the first passivation layer, and the common electrode overlaps the pixel areas. A second passivation layer covers the common electrode. A pixel electrode is on the second passivation layer, the pixel electrode overlaps the common electrode, and the pixel electrode is electrically connected to the drain electrode through a first contact hole and the data line through a second contact hole.

9 Claims, 9 Drawing Sheets (51) Int. Cl.
  *G02F 1/1343* (2006.01)
  *G02F 1/1368* (2006.01)
  *G02F 1/1335* (2006.01)
  *G02F 1/1339* (2006.01)

(52) U.S. Cl.
  CPC ...... *G02F 1/1368* (2013.01); *G02F 1/133512* (2013.01); *G02F 1/133514* (2013.01); *G02F 1/136286* (2013.01); *G02F 1/134363* (2013.01); *G02F 2001/13629* (2013.01); *G02F 2001/134372* (2013.01)

(58) Field of Classification Search
  CPC ............. G02F 1/1368; G02F 1/136209; G02F 1/133345; G02F 1/13394; G02F 1/361; G02F 2001/13629; G02F 2001/136222; G02F 2001/133397; G02F 2001/134372; G02F 2201/42; G02F 2202/02; G02F 2202/022; G02F 2202/023; G02F 1/134363; G02F 1/13345
  USPC ................... 349/42, 138, 141, 155, 106, 110
  See application file for complete search history.

(56) References Cited

U.S. PATENT DOCUMENTS

| | | | |
|---|---|---|---|
| 2011/0122357 A1* | 5/2011 | Chang | G02F 1/133512 349/155 |
| 2012/0169985 A1* | 7/2012 | Kim | G02F 1/136227 349/139 |
| 2013/0020591 A1* | 1/2013 | Park | G02F 1/1368 257/88 |

FOREIGN PATENT DOCUMENTS

| | | |
|---|---|---|
| KR | 10-2014-0064040 A | 5/2014 |
| KR | 10-2014-0074479 A | 6/2014 |
| KR | 10-2014-0074660 A | 6/2014 |

* cited by examiner

DISPLAY PANEL AND METHOD OF MANUFACTURING THE SAME

CROSS-REFERENCE TO RELATED APPLICATION

This application claims priority to and the benefit of Korean Patent Application No. 10-2014-0154716, filed on Nov. 7, 2014, in the Korean Intellectual Property Office (KIPO), the content of which is herein incorporated by reference in its entirety.

BACKGROUND

1. Field

Example embodiments relate generally to display apparatuses, and more particularly to display panels and methods of manufacturing the display panels.

2. Description of the Related Art

A liquid crystal display ("LCD") apparatus is an example of flat panel displays ("FPD"), which has recently been broadly used. Other examples of the FPD include, but are not limited to, a plasma display panel ("PDP") and an organic light emitting display ("OLED").

The LCD apparatus applies voltages to molecules of liquid crystal to adjust arrangements of the molecules thereby changing optical characteristics of a liquid crystal cell such as birefringence, optical activity, dichroism and light scattering to display an image.

Recently, in order to solve a low side visibility problem of a related art LCD apparatus, LCD apparatuses having patterned vertical alignment ("PVA") mode, in-plane switching ("IPS") mode, etc., are developed. However, a LCD apparatus having PVA mode has afterimage defects and increase limitation of a side viewing angle, and a LCD apparatus having IPS mode has a disadvantage that luminance of a displayed image is low. In order to solve these disadvantages, a LCD apparatus having plane to line switching ("PLS") mode is developed.

The LCD apparatus having PLS mode includes a common electrode on a substrate and a pixel electrode overlapping the common electrode and connects a data line with the pixel electrode to increase an aperture ratio. Accordingly, a contact hole is formed on the data line to connect the pixel electrode with the data line.

In order to form the contact hole, two exposure processes are required. In particular, a first exposure process to etch an organic layer to planarize the substrate and a second exposure process to expose the data line are needed.

However, when an overlay margin of an exposure apparatus is 1 μm, the contact hole may be formed with a maximum 2 μm misalignment from a desired position of the contact hole by the two exposure processes. Accordingly, a passivation layer on the organic layer and near the data line may be etched, and a portion of the organic layer may be exposed. When the portion of the organic layer is exposed, active unfilled area ("AUA") defects and high temperature afterimage defects occur.

SUMMARY

Accordingly, an aspect of an example embodiment of the inventive concept is provided to substantially obviate one or more problems due to limitations and disadvantages of the related art.

Some aspects of some example embodiments provide a display panel capable of reducing AUA defects and high temperature afterimage defects.

Some aspects of some example embodiments provide a method of manufacturing the display panel.

According to example embodiments, a display panel includes a first substrate, a second substrate, a liquid crystal layer, a gate line, a data line, a thin film transistor, an organic pattern, a first passivation layer, a common electrode, a second passivation layer and a pixel electrode. The first substrate has a plurality of pixel areas. The second substrate faces (e.g., is opposite to) the first substrate. The liquid crystal layer is disposed between the first and second substrates. The gate line extends along a first direction on the first substrate. The data line is disposed on the gate line, and the data line extends along a second direction crossing the first direction. The thin film transistor is connected to the gate line and the data line, and the thin film transistor includes a gate electrode, a semiconductor pattern, a source electrode and a drain electrode. The organic pattern makes contact with a side surface of the data line and a side surface of the thin film transistor, and the organic pattern overlaps the pixel areas. The first passivation layer is disposed on the data line, the thin film transistor and the organic pattern. The common electrode is disposed on the first passivation layer, and the common electrode overlaps the pixel areas. The second passivation layer covers the common electrode. The pixel electrode is disposed on the second passivation layer, the pixel electrode overlaps the common electrode, and the pixel electrode is electrically connected to the drain electrode through a first contact hole and the data line through a second contact hole.

In an example embodiment, the organic pattern may be further disposed on the semiconductor pattern and between the source electrode and the drain electrode spaced apart from the source electrode.

In an example embodiment, the organic pattern may include a positive-type photosensitivity (positive resist) organic material.

In an example embodiment, the first passivation layer may cover the organic pattern.

In an example embodiment, the pixel electrode may have a slit pattern.

In an example embodiment, the second contact hole may be provided on the data line, and a width of the second contact hole may be less than a width of the data line.

In an example embodiment, the width of the second contact hole may be less than the width of the data line by about 1 μm.

In an example embodiment, the display panel may further include a color filter and a black matrix. The color filter may be disposed on the second substrate, and the color filter may overlap the pixel areas. The black matrix may be disposed on the color filter, and the black matrix may overlap the gate line, the data line and the thin film transistor.

In an example embodiment, the display panel may further include a color filter and a black matrix. The color filter may be disposed on the first substrate, and the color filter may overlap the pixel areas. The black matrix may be disposed on the second substrate, and the black matrix may overlap the gate line, the data line and the thin film transistor.

In an example embodiment, the display panel may further include a color filter and a black column spacer. The color filter may be disposed on the first substrate, and the color filter may overlap the pixel areas. The black column spacer may be disposed on the data line and the thin film transistor.

The black column spacer may maintain a cell gap between the first and second substrates.

According to example embodiments, in a method of manufacturing a display panel, a metal layer is formed on a first substrate. A gate electrode and a semiconductor pattern overlapping the gate electrode are formed on the first substrate. A photo pattern is formed on the metal layer. A data pattern including a source electrode, a drain electrode and a data line is formed by etching the metal layer utilizing the photo pattern as a mask. An organic layer is formed on the first substrate. An organic pattern is formed by developing the organic layer overlapping the photo pattern. The photo pattern is removed. A first passivation layer is formed by coating the first substrate with inorganic material. A common electrode is formed on the first passivation layer. The common electrode overlaps the organic pattern. A second passivation layer is formed by coating the first substrate with inorganic material. A first contact hole exposing the drain electrode and a second contact hole exposing the data line are formed by etching the first and second passivation layers. A pixel electrode electrically connected to the drain electrode through the first contact hole is formed. The data line through the second contact hole is formed. The pixel electrode overlaps the common electrode on the second passivation layer. The first substrate is attached to a second substrate facing (e.g., opposite to) the first substrate. A liquid crystal layer is formed by injecting a liquid crystal between the first and second substrates.

In an example embodiment, the organic pattern may be further hardened.

In an example embodiment, the organic pattern may be hardened at a temperature of about 70° C. to about 110° C.

In an example embodiment, the photo pattern may include a negative-type photosensitivity (negative resist) organic material.

In an example embodiment, the organic pattern may include a positive-type photosensitivity (positive resist) organic material.

In an example embodiment, the inorganic material may include silicon oxide (SiOx) and/or silicon nitride (SiNx).

In an example embodiment, the common electrode and the pixel electrode may include at least one transparent conductive material selected from the group consisting of indium tin oxide (ITO), indium zinc oxide (IZO) and aluminum zinc oxide (AZO).

In an example embodiment, the pixel electrode may have a slit pattern.

In an example embodiment, the second contact hole may be formed on the data line, and a width of the second contact hole may be less than a width of the data line.

In an example embodiment, the width of the second contact hole may be less than the width of the data line by about 1 μm.

According to example embodiments, an organic pattern and a data pattern do not overlap each other, and the organic pattern is not exposed to a liquid crystal to prevent AUA defects and high temperature afterimage defects.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Various example embodiments will be described more fully with reference to the accompanying drawings, in which embodiments are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. Like reference numerals refer to like elements throughout this application. Further, the use of "may" when describing embodiments of the present invention refers to "one or more embodiments of the present invention." As used herein, the term "substantially," "about," and similar terms are used as terms of approximation and not as terms of degree, and are intended to account for the inherent deviations in measured or calculated values that would be recognized by those of ordinary skill in the art. Also, as used herein, the terms "use," "using," and "used" may be considered synonymous with the terms "utilize," "utilizing," and "utilized," respectively.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "on", "connected" or "coupled" to another element, it can be directly on, connected or coupled to the other element, or one or more intervening elements may be present. In contrast, when an element is referred to as being "directly on", "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
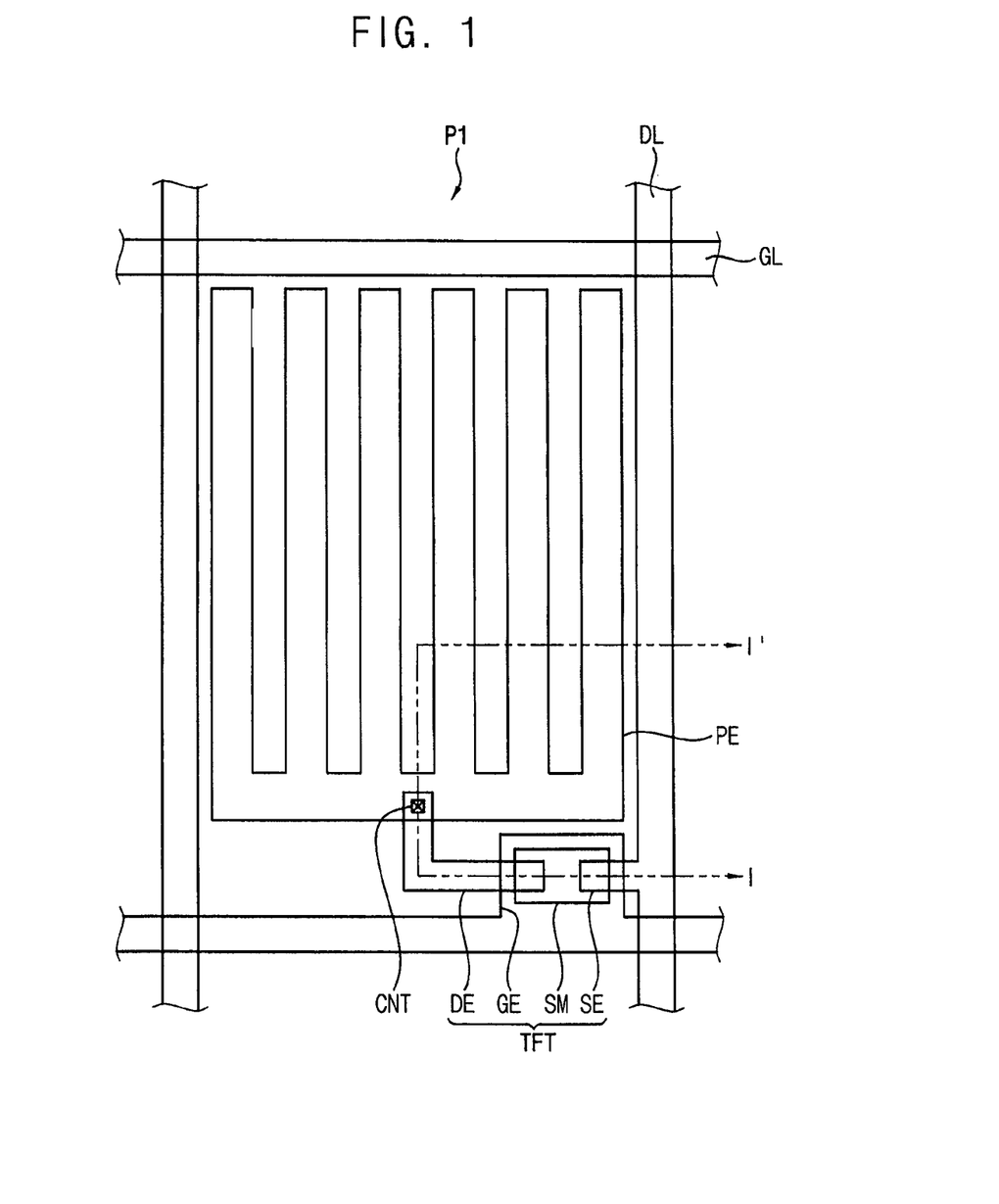
FIG. 1 is a plan view illustrating a first pixel of a display panel according to an example embodiment.
Figure 2:
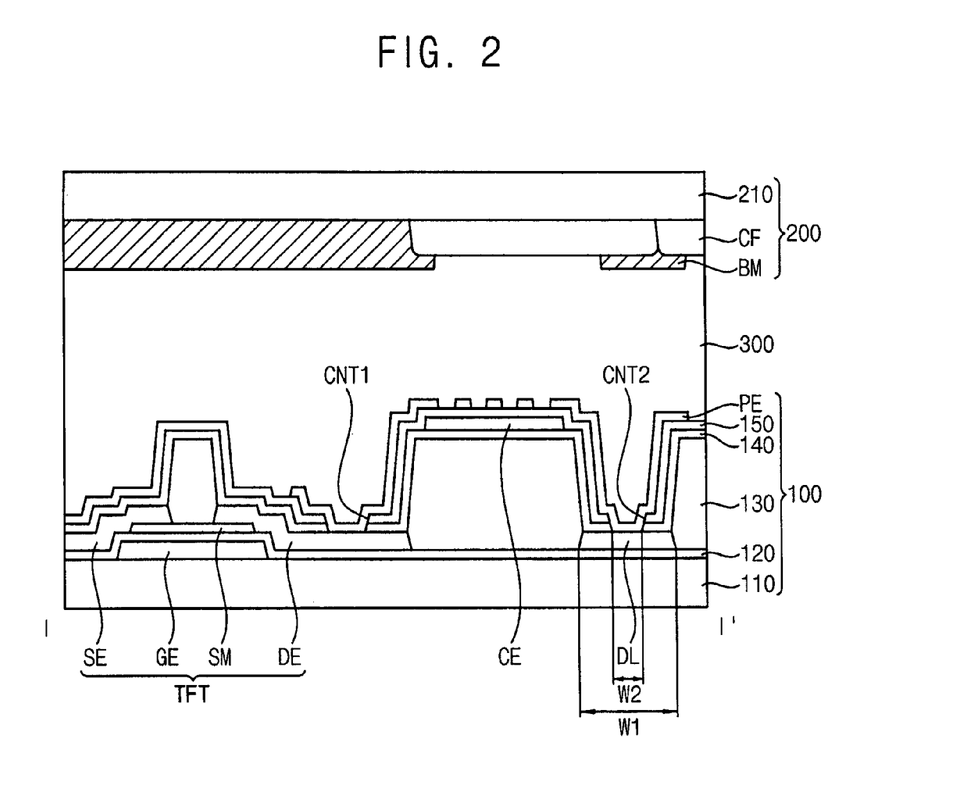
FIG. 2 is a cross-sectional view illustrating a display panel according to an example embodiment cut along line I-I' in FIG. 1.

FIG. 1 is a plan view illustrating a first pixel of a display panel according to an example embodiment. FIG. 2 is a cross-sectional view illustrating a display panel according to an example embodiment cut along line I-I' in FIG. 1.

Referring to FIGS. 1 and 2, the display panel includes a plurality of gate lines GL, a plurality of data lines DL and a plurality of pixels.

The plurality of gate lines may extend along a first direction D1. The plurality of data lines may extend along a second direction D2 crossing (e.g., substantially perpendicular to) the first direction D1. Alternatively, although not illustrated in FIG. 1, the plurality of gate lines may extend along the second direction D2, and the plurality of data lines may extend along the first direction D1.

The plurality of pixels may be arranged in a matrix form. The plurality of pixels may be disposed in a plurality of pixel areas that are defined by the plurality of gate lines GL and the plurality of data lines DL.

Each pixel may be connected to a respective one of the gate lines (e.g., an adjacent one gate line) and a respective one of the data lines (e.g., an adjacent one data line).

Each pixel may have, but is not limited to, a rectangular shape. Alternatively, for example, each pixel may have a V shape, a Z shape, etc.

The display panel includes a first substrate 100, a second substrate 200 and a liquid crystal layer 300.

The first substrate 100 includes a first base substrate 110, a gate insulation layer 120, a data pattern, an organic pattern 130, a first passivation layer 140, a common electrode CE, a second passivation layer 150 and a pixel electrode PE.

The first base substrate 110 may be a transparent substrate that includes insulation material. For example, the first base substrate 110 may be a glass substrate or a transparent plastic substrate. The first base substrate 110 may include the plurality of pixel areas for displaying an image. The plurality of pixel areas may be arranged in a matrix form.

Each pixel may include a switching element. For example, the thin film transistor TFT may be the switching element. The switching element may be connected to the respective one of the gate lines (e.g., the adjacent one gate line) and the respective one of the data lines (e.g., the adjacent one data line). For example, the switching element may be disposed at an area at which the respective one of the gate lines and the respective one of the data lines cross each other.

A gate pattern may be disposed on the first base substrate 110. The gate pattern may include a gate electrode GE and the gate line GL. The gate line GL may be electrically connected to the gate electrode GE.

The gate insulation layer 120 may be disposed on the first base substrate 110 on which the gate pattern is disposed, and the gate insulation layer 120 may cover the gate pattern. The gate pattern may be insulated by the gate insulation layer 120.

A semiconductor pattern SM may be disposed on the gate insulation layer 120. The semiconductor pattern SM may overlap the gate electrode GE.

A data pattern may be disposed on the gate insulation layer 120 on which the semiconductor pattern SM is disposed. The data pattern may include a source electrode SE, a drain electrode DE and the data line DL. The source electrode SE may partially overlap the semiconductor pattern SM. The source electrode SE may be electrically connected to the data line DL.

The drain electrode DE may partially overlap the semiconductor pattern SM and may be spaced apart from the source electrode SE with respect to the semiconductor pattern SM. The semiconductor pattern SM may have a conductive channel between the source electrode SE and the drain electrode DE.

The thin film transistor TFT may include the gate electrode GE, the source electrode SE, the drain electrode and the semiconductor pattern SM.

The gate insulation layer 120 may include inorganic insulation material. For example, the gate insulation layer 120 may include silicon oxide ($SiO_x$) or silicon nitride ($SiN_x$).

The organic pattern 130 making contact with a side surface of the data pattern may be disposed on the gate insulation layer 120. Accordingly, the organic pattern 130 may not overlap the data pattern.

For example, the organic pattern 130 may make contact with a side surface of the data line DL and a side surface of the thin film transistor TFT. The organic pattern 130 may overlap the pixel areas.

In addition, the organic pattern 130 may be disposed on the semiconductor pattern SM and between the source electrode SE and the drain electrode DE spaced apart from each other.

The organic pattern 130 may include photosensitivity organic material. For example, the photosensitivity organic material may be a positive-type photosensitivity (positive resist) organic material such as photoacrylic.

The first passivation layer 140 may be disposed on the data pattern and the organic pattern 130. For example, the first passivation layer 140 may be disposed on the data line DL, the thin film transistor TFT and the organic pattern 130.

For example, the first passivation layer 140 may cover the organic pattern 130. Accordingly, the first passivation layer 140 may cover a top surface and a side surface of the organic pattern 130, and the first passivation layer 140 may prevent the organic pattern 130 from being exposed.

The first passivation layer 140 may include inorganic insulation material. For example, the first passivation layer 140 may include silicon oxide ($SiO_x$) and/or silicon nitride ($SiN_x$).

The common electrode CE may be disposed on the first passivation layer 140. The common electrode CE may overlap the pixel areas.

A common voltage may be applied to the common electrode CE, and a fringe field may be formed in the liquid crystal layer 300 between the pixel electrode PE and the common electrode CE. Accordingly, the display panel may be operated in a PLS mode.

For example, the common electrode CE may include at least one transparent conductive material selected from the group consisting of indium tin oxide (ITO), indium zinc oxide (IZO) and aluminum zinc oxide (AZO).

The second passivation layer 150 may cover the common electrode CE. Accordingly, the common electrode CE may be insulated by the second passivation layer 150.

For example, the second passivation layer 150 may be disposed on the first passivation layer 140 and the common electrode CE.

The second passivation layer 150 may include inorganic insulation material. For example, the second passivation layer 150 may include silicon oxide ($SiO_x$) and/or silicon nitride ($SiN_x$).

The pixel electrode PE may be disposed on the second passivation layer 150. The pixel electrode PE may overlap the common electrode CE, and a grayscale voltage may be applied to the pixel electrode PE.

The pixel electrode PE may be electrically connected to the drain electrode DE of the thin film transistor TFT through a first contact hole CNT1. The pixel electrode PE may be electrically connected to the data line DL though a second contact hole CNT2. Accordingly, the grayscale voltage may be applied to the pixel electrode PE through the data pattern.

The second contact hole CNT2 may be formed on the data line DL. For example, a width w2 of the second contact hole CNT2 may be less than a width w1 of the data line DL. For example, the width w2 of the second contact hole CNT2 may be less than the width w2 of the data line DL by about 1 μm.

For example, the width w1 of the data line DL may be in a range of about 4 μm to about 6 μm, and the width w2 of the second contact hole CNT2 may be in a range of about 3 μm to 5 μm. In addition, when the width w1 of the data line DL is 4 μm, the width w2 of the second contact hole CNT2 may be in a range of about 3 μm to about 4 μm. When the width w1 of the data line DL is 6 μm, the width w2 of the second contact hole CNT2 may be in a range of about 5 μm to about 6 μm.

For example, the pixel electrode PE may include at least one transparent conductive material selected from the group consisting of indium tin oxide (ITO), indium zinc oxide (IZO) and aluminum zinc oxide (AZO).

For example, the pixel electrode PE may have a slit pattern.

The pixel electrode PE and the common electrode CE may be formed to overlap each other. Accordingly, with the common electrode CE to which the common voltage is applied and the pixel electrode PE to which the grayscale voltage is applied, the fringe field may be formed in the liquid crystal layer 300. The display panel may operate in the PLS mode.

The second substrate 200 may include a second base substrate 210, color filter CF and black matrix BM.

The second base substrate 210 may be a transparent substrate that includes insulation material. For example, the second base substrate 210 may be a glass substrate or a transparent plastic substrate.

The color filter CF may be disposed on the second base substrate 210. The color filter CF may be disposed between the data lines DL that are adjacent to each other.

The color filter CF may provide a color to a light transmitting the liquid crystal layer 300. A plurality of color filters CF may be disposed on the second base substrate 210. The color filters CF may include a red color filter, green color filter and a blue color filter.

Each color filter CF may overlap a respective one of the pixel areas. The color filters CF, which are adjacent to each other, may have different colors from each other between pixel areas adjacent to each other.

The color filters CF may be formed to be spaced apart from a border between the pixel areas adjacent to each other in the first direction D1 and in the second direction D2 crossing the first direction D1. The color filters CF may be formed in an island-shape with borders which are the gate lines GL and data lines DL in the first and second directions D1 and D2. Alternatively, the color filters CF may be overlapped on a border between the pixel areas adjacent to each other.

The black matrix BM may be disposed on the color filter CF, and the black matrix BM may block light.

The black matrix BM may be formed to correspond to a non-display area of a pixel, and the black matrix BM may block the light which is provided from the outside.

For example, the black matrix BM may overlap the gate line GL, the data line DL and the thin film transistor TFT.

For example, the black matrix BM may be formed to include black material including photosensitivity organic material.

For example, the black matrix BM may include stain such as carbon black, organic/inorganic pigment, color (R, G and B) mix pigment, etc. to display black color.

The liquid crystal layer 300 may be disposed between the first and second substrates 100 and 200.

The liquid crystal layer 300 may include liquid crystal molecules. An electric field may be generated by voltages applied to the pixel electrode and the common electrode. By adjusting an intensity of the electric field and an arrangement of the liquid crystal molecules, transmittance of light passing through the liquid crystal layer 300 may be adjusted such that a desired image may be displayed.

Although not illustrated in FIG. 2, the LCD apparatus may further include an alignment layer to align the liquid crystal molecules of the liquid crystal layer 300.

The alignment layer may be provided for pre-tilt of the liquid crystal molecules.

FIGS. 3A to 3K are cross-sectional views for describing a method of manufacturing a display panel according to an example embodiment.

Figure 3A:
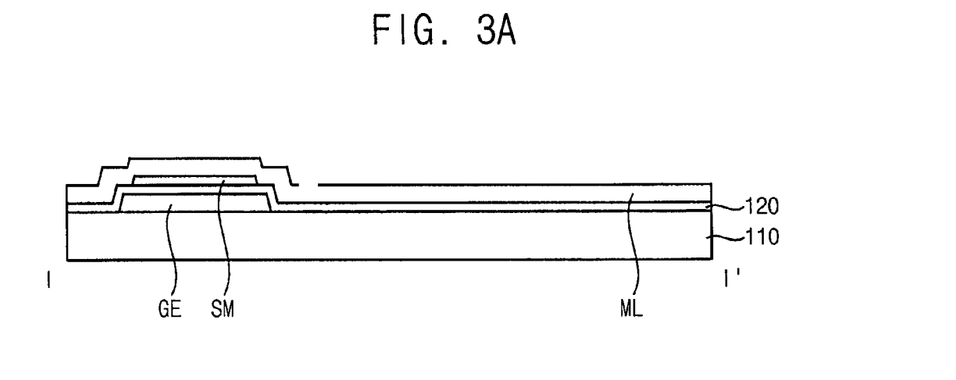
FIGS. 3A to 3K are cross-sectional views for describing a method of manufacturing a display panel according to an example embodiment.

Referring to FIG. 3A, a gate electrode GE is formed on a first base substrate 110.

An inorganic insulation material may be deposited on the gate electrode GE to form a gate insulation layer 120.

A semiconductor pattern SM overlapping the gate electrode GE may be formed on the gate insulation layer 120.

Metal may be deposited on the gate insulation layer 120 on which the semiconductor pattern SM is formed. The metal may be provided to form a metal layer ML to form a data pattern.

For example, the metal may include copper (Cu), aluminum (Al), molybdenum (Mo), titanium (Ti) and/or an alloy thereof.

Figure 3B:
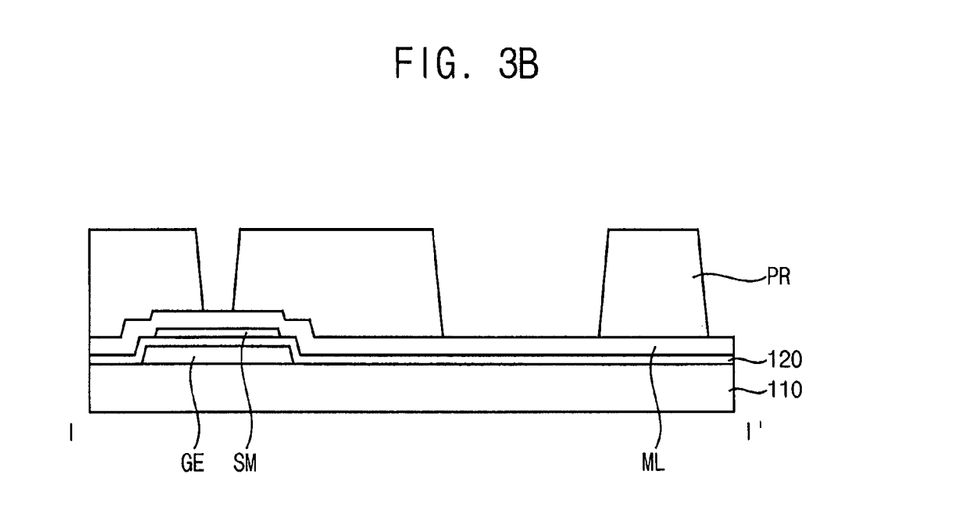

Referring to FIG. 3B, the metal layer ML is coated with a photoresist material to form a photoresist layer.

For example, the photoresist layer may include photosensitive organic material. The photosensitive organic material may include a negative-type photosensitive (negative resist) organic material.

The photoresist layer may be patterned by using a mask to form a photo pattern PR.

The photo pattern PR may be formed by patterning the photoresist layer through a photolithography process.

Figure 3C:
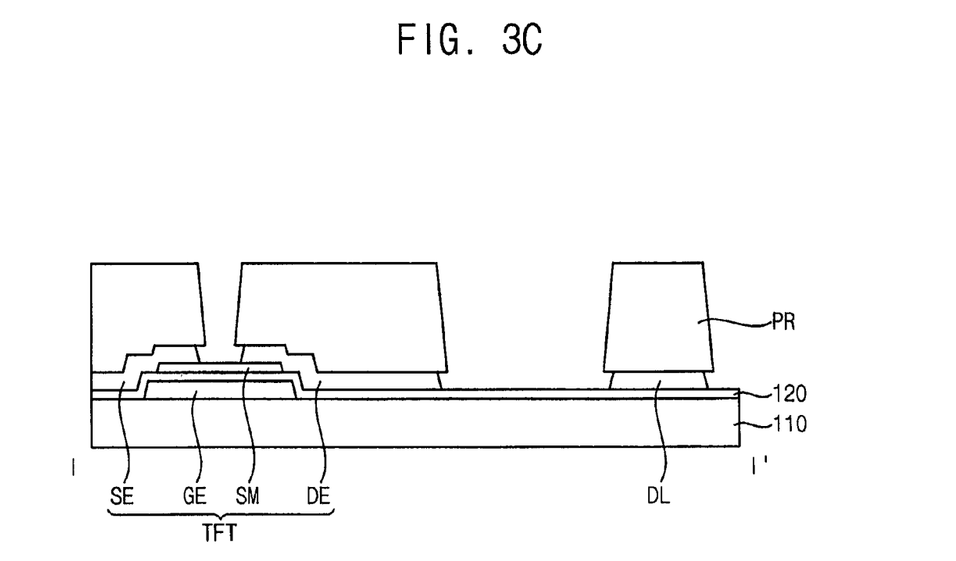

Referring to FIG. 3C, the metal layer ML is etched by using the photo pattern PR as a mask to form the data pattern.

The data pattern may include a source electrode SE, a drain electrode DE and a data line DL.

The source electrode SE, the drain electrode DE may overlap the semiconductor pattern SM. The drain electrode DE may be spaced apart from the source electrode SE on the semiconductor pattern SM.

The semiconductor pattern SM may have a conductive channel formed between the source electrode SE and the drain electrode DE.

Figure 3D:
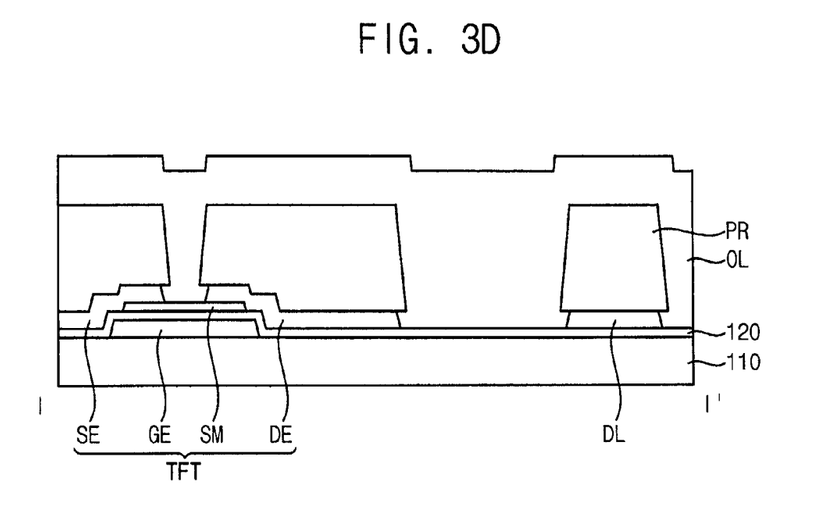

Referring to FIG. 3D, the data pattern and the photo pattern PR are coated with photosensitive organic material to form an organic layer OL.

For example, the photosensitive organic material may include a positive-type photosensitive (positive resist) organic material such as photoacrylic.

Figure 3E:
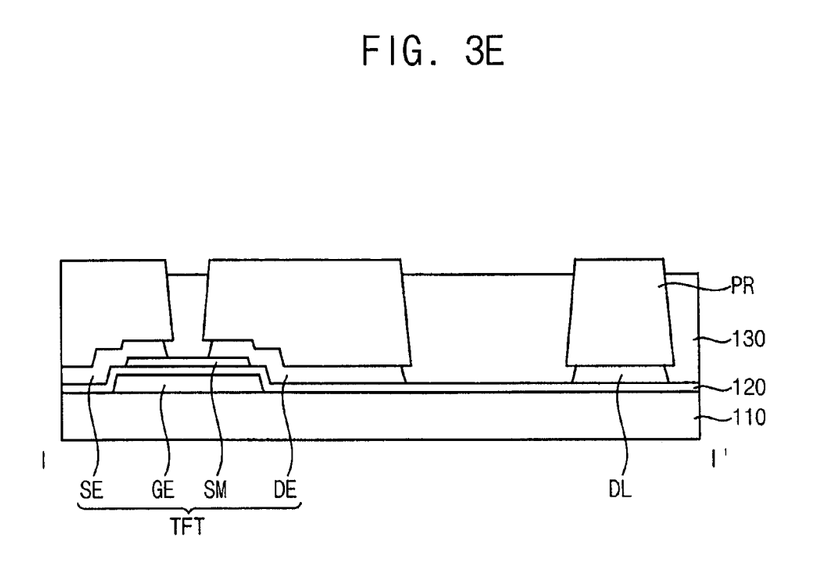

Referring to FIG. 3E, a portion of the organic layer OL overlapping the photo pattern PR is exposed. The portion of the organic layer OL is activated, by the exposure, to be developed.

The organic layer OL may be developed to form an organic pattern 130. For example, the organic pattern 130 may be disposed on the gate insulation layer 120, and the organic pattern 130 may make contact with a side surface of the data pattern. Accordingly, the organic pattern 130 may not overlap the data pattern.

For example, the organic pattern 130 may make contact with a side surface of the data line DL and a side surface of the thin film transistor TFT. The organic pattern 130 may overlap pixel areas.

In addition, the organic pattern 130 may make contact with a side surface of the source electrode SE and a side surface of the drain electrode DE spaced apart from the source electrode SE on the semiconductor SM. The organic pattern 130 may be disposed between the source electrode SE and the drain electrode DE.

After the organic layer OL is developed, the organic pattern 130 may be hardened. Also, before the photo pattern PR is removed, the organic pattern 130 may be hardened. Accordingly, the photo pattern PR may serve as a dam, and although the organic pattern 130 is hardened, the organic pattern 130 may not overlap the data pattern. For example, the organic pattern 130 may be hardened at a temperature of about 70° C. to about 110° C.

Figure 3F:
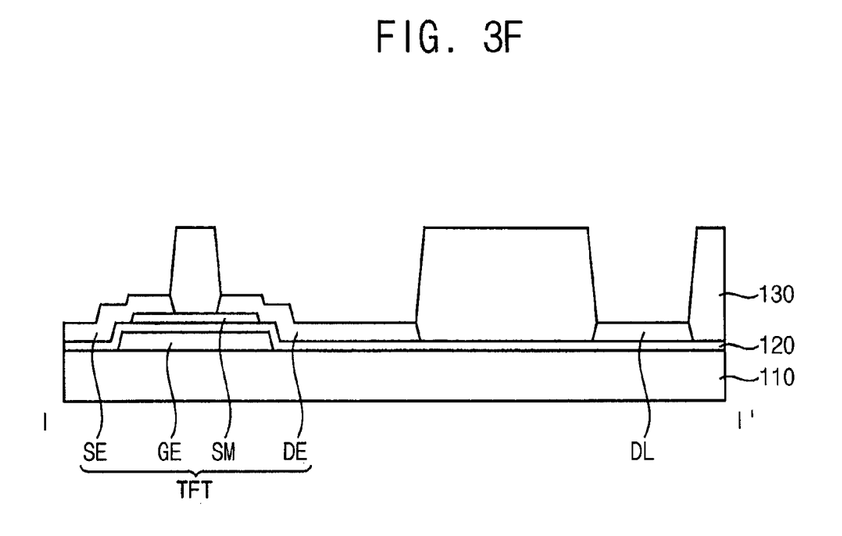

Referring to FIG. 3F, after the organic pattern 130 is formed, the photo pattern PR is removed.

The photo pattern PR may be removed by using a stripper including organic solvent or alkaline solution. For example, the stripper may include alkali hydroxide (such as sodium hydroxide (NaOH), potassium hydroxide (KOH), etc.), and/or aqueous solution including ammonium hydroxide ($NH_3OH$) and/or tetramethylammonium hydroxide (TMAH).

Figure 3G:
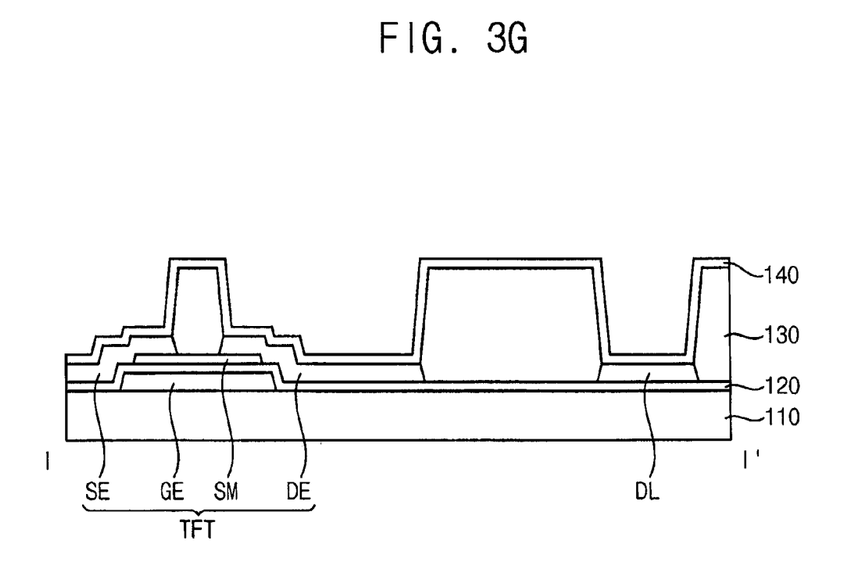

Referring to FIG. 3G, the first base substrate 110 is coated with inorganic material to form a first passivation layer 140.

The first passivation layer 140 may be formed on the data pattern and the organic pattern 130. For example, the first passivation layer 140 may be disposed on the data line DL, the thin film transistor TFT and the organic pattern 130.

For example, the first passivation layer 140 may cover the organic pattern 130. Accordingly, the first passivation layer 140 may block or cover a top surface and a side surface of the organic pattern 130, and the first passivation layer 140 may prevent the organic pattern 130 from being exposed.

For example, the inorganic material may include silicon oxide ($SiOx$) and/or silicon nitride ($SiNx$).

Figure 3H:
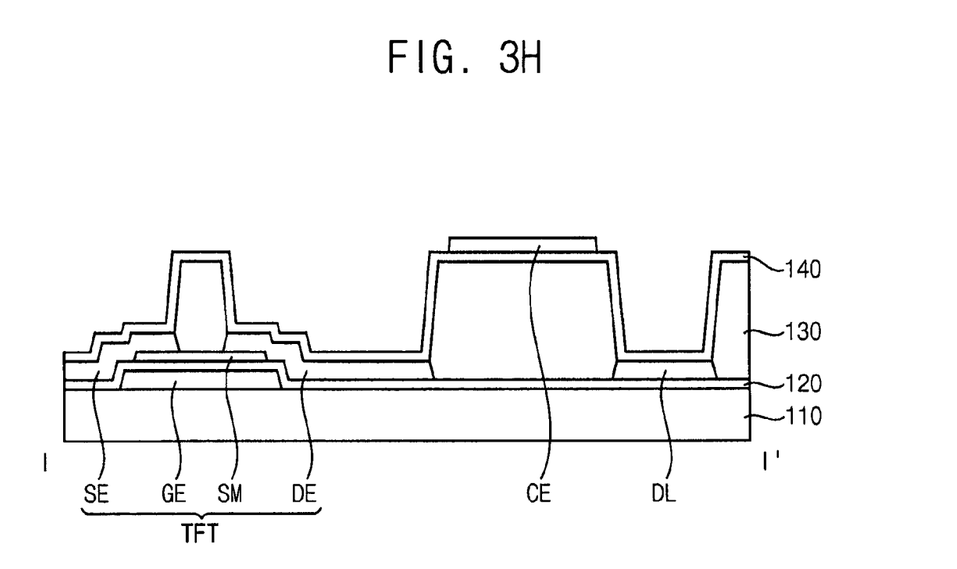

Referring to FIG. 3H, a common electrode CE is formed on the first passivation layer 140.

The common electrode CE may be formed to overlap the organic pattern 130. The common electrode CE may overlap the pixel areas.

A common voltage may be applied to the common electrode, and a fringe field may be generated in a liquid crystal layer 300 between a pixel electrode PE and the common electrode CE. Accordingly, a display panel may operate in a PLS mode.

For example, the common electrode CE may include at least one transparent conductive material selected from the group consisting of indium tin oxide (ITO), indium zinc oxide (IZO) and aluminum zinc oxide (AZO).

Figure 3I:
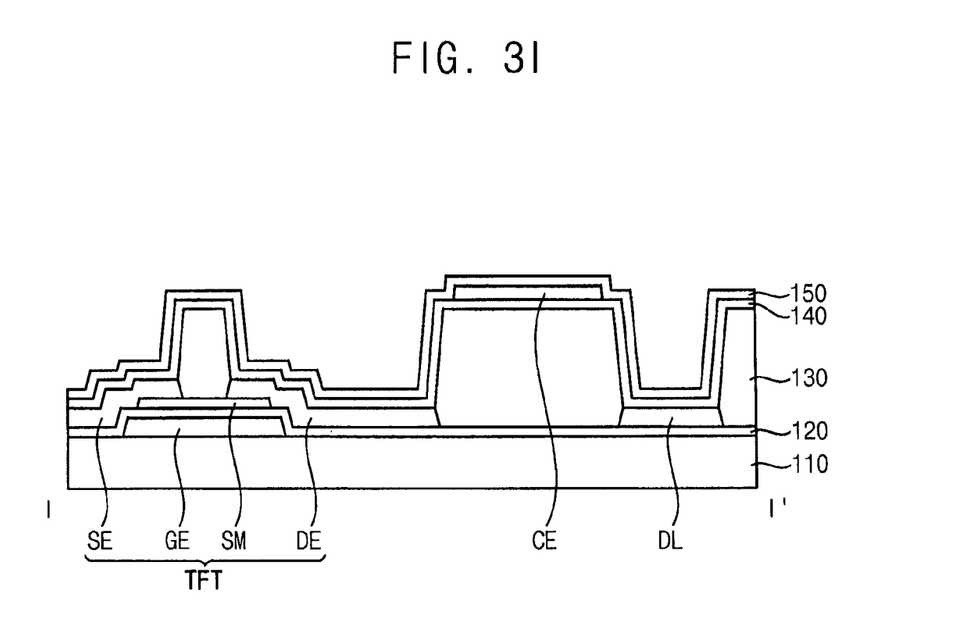

Referring to FIG. 3I, the first base substrate 110 is coated with inorganic material to form a second passivation layer 150.

The second passivation layer 150 may cover the common electrode CE. Accordingly, the common electrode CE may be insulated by the second passivation layer 150.

For example, the second passivation layer 150 may be formed on the first passivation layer 140 and the common electrode CE.

For example, the inorganic material may include silicon oxide ($SiOx$) and/or silicon nitride ($SiNx$).

Figure 3J:
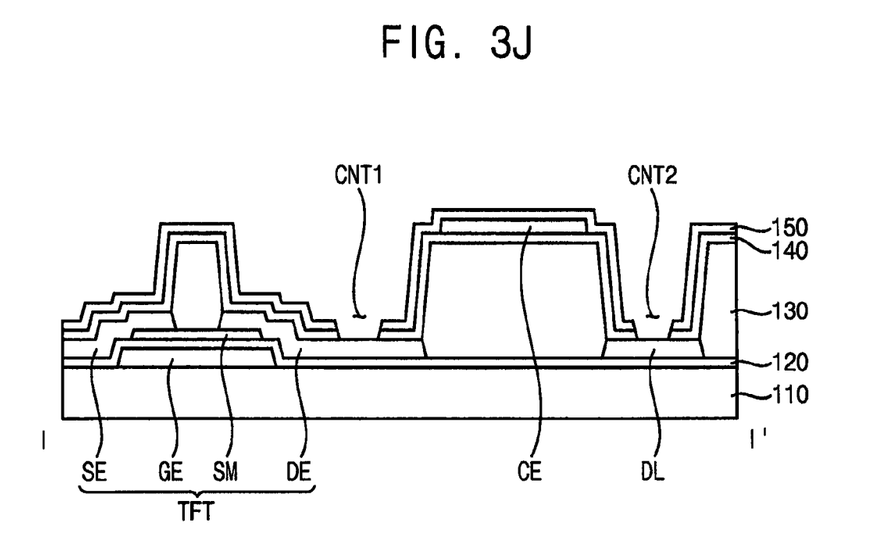

Referring to FIG. 3J, the first and second passivation layers 140 and 150 are etched to form first and second contact holes CNT1 and CNT2.

A portion of the first passivation layer 140 and a portion of the second passivation layer 150 may be removed to expose a portion of the drain electrode DE through the first contact hole CNT1.

A portion of the first passivation layer 140 and a portion of the second passivation layer 150 may be removed to expose a portion of the data line DL through the second contact hole CNT2.

The second contact hole CNT2 may be formed on the data line DL. For example, a width w2 of the second contact hole CNT2 may be less than a width w1 of the data line DL. For example, the width w2 of the second contact hole CNT2 may be less than the width w2 of the data line DL by about 1 μm.

For example, the width w1 of the data line DL may be in a range of about 4 μm to about 6 μm, and the width w2 of the second contact hole CNT2 may be in a range of about 3 μm to 5 μm. In addition, when the width w1 of the data line DL is 4 μm, the width w2 of the second contact hole CNT2 may be in a range of about 3 μm to about 4 μm. When the width w1 of the data line DL is 6 μm, the width w2 of the second contact hole CNT2 may be in a range of about 5 μm to about 6 μm.

Figure 3K:
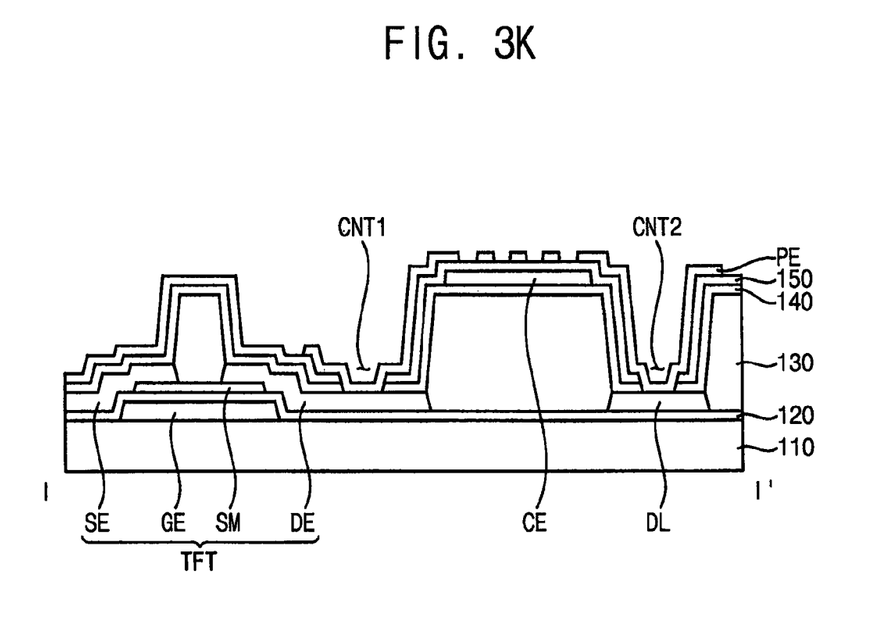

Referring to FIG. 3K, a pixel electrode PE is formed on the second passivation layer 150.

The pixel electrode PE may overlap the common electrode CE, and a grayscale voltage may be applied to the pixel electrode PE.

The pixel electrode PE may be electrically connected to the drain electrode DE of the thin film transistor TFT through a first contact hole CNT1. The pixel electrode PE may be electrically connected to the data line DL though a second contact hole CNT2. Accordingly, the grayscale voltage may be applied to the pixel electrode PE through the data pattern.

For example, the pixel electrode PE may include at least one transparent conductive material selected from the group consisting of indium tin oxide (ITO), indium zinc oxide (IZO) and aluminum zinc oxide (AZO).

For example, the pixel electrode PE may have a slit pattern.

The pixel electrode PE and the common electrode CE may be formed to overlap each other. Accordingly, with the common electrode CE to which the common voltage is applied and the pixel electrode PE to which the grayscale voltage is applied, the fringe field may be formed in the liquid crystal layer 300. The display panel may operate in the PLS mode.

Referring back to FIG. 2, a color filter CF and a black matrix BM are formed on a second base substrate 210.

The second base substrate 210 may be a transparent substrate that includes insulation material. For example, the second base substrate 210 may be a glass substrate or a transparent plastic substrate.

The color filter CF may be formed on the second base substrate 210. The color filter CF may be disposed between the data lines DL which are adjacent to each other.

The black matrix BM may be formed on the color filter CF.

The black matrix BM may be formed to correspond to a non-display area of a pixel, and the black matrix BM may block light which is provided from outside.

For example, the black matrix BM may overlap the gate line GL, the data line DL and the thin film transistor TFT.

For example, the black matrix BM may be formed to include black material including photosensitivity organic material.

For example, the black matrix BM may include stain such as carbon black, organic/inorganic pigment, color (R, G and B) mix pigment, etc. to display black color.

The second substrate 200 may be disposed to be opposite to the first substrate 100.

The liquid crystal layer 300 may be formed by injecting a liquid crystal between the first and second substrates 100 and 200.

The liquid crystal layer 300 may include liquid crystal molecules. An electric field may be generated by voltages applied to the pixel electrode and the common electrode. By adjusting an intensity of the electric field and an arrangement of the liquid crystal molecules, transmittance of light passing through the liquid crystal layer 300 may be adjusted such that a desired image may be displayed.

Although not illustrated in FIG. 2, the LCD apparatus may further include an alignment layer to align the liquid crystal molecules of the liquid crystal layer 300.

The alignment layer may be provided for pre-tilt of the liquid crystal molecules.

Figure 4:
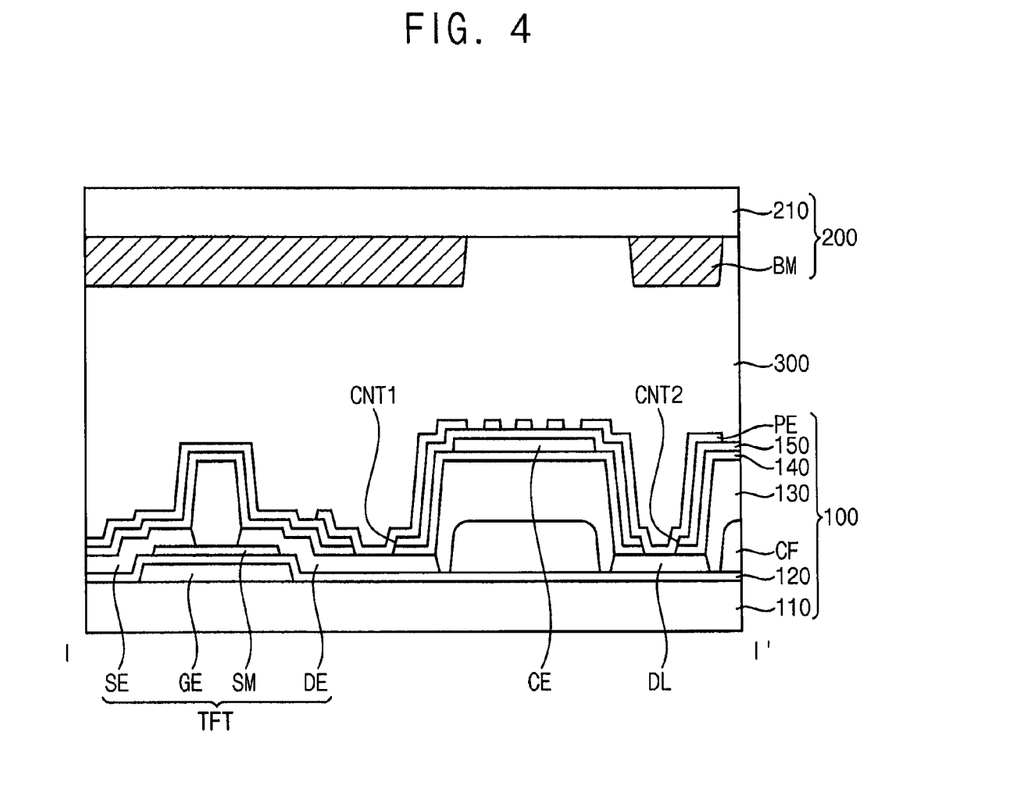
FIG. 4 is a cross-sectional view illustrating a display panel according to an example embodiment cut along line I-I' in FIG. 1.

FIG. 4 is a cross-sectional view illustrating a display panel according to an example embodiment cut along line I-I' in FIG. 1.

The display panel according to an example embodiment in FIG. 4 may be substantially the same as or similar to the display panel illustrated in FIG. 2, except that a color filter CF is included in a first substrate 100. Thus, like reference numerals refer to like elements, and detailed descriptions thereon are omitted herein.

Referring to FIG. 4, the display panel includes a first substrate 100, a second substrate 200 and a liquid crystal layer 300.

The first substrate 100 includes a first base substrate 110, a gate insulation layer 120, a data pattern, a color filter CF, an organic pattern 130, a first passivation layer 140, a common electrode CE, a second passivation layer 150 and a pixel electrode PE. The first substrate 100 may have a color filter on array (COA) structure (i.e., a color filter that is formed on an array substrate).

The color filter CF may be disposed on the gate insulation layer 120. The color filter CF may overlap pixel areas.

The color filter CF may be disposed between the data lines DL which are adjacent to each other.

The color filter CF may provide a color to a light transmitting the liquid crystal layer 300. A plurality of color filters CF may be disposed on the gate insulation layer 120. The color filters CF may include a red color filter, green color filter and a blue color filter.

Each color filter CF may correspond to a respective one of the pixel areas. The color filters CF, which are adjacent to each other, may have different colors from each other between pixel areas adjacent to each other.

For example, the color filters CF may be formed to be spaced apart from a border between the pixel areas adjacent to each other in the first direction D1 and in the second direction D2 crossing the first direction D1. The color filters CF may be formed in an island-shape with borders which are the gate lines GL and data lines DL in the first and second directions D1 and D2. Alternatively, the color filters CF may be overlapped on a border between the pixel areas adjacent to each other.

The organic pattern 130 may be disposed on the color filter CF. For example, the organic pattern 130 may cover the color filter CF.

The second substrate 200 may include a second base substrate 210 and black matrix BM.

The liquid crystal layer 300 may be disposed between the first and second substrates 100 and 200.

Figure 5:
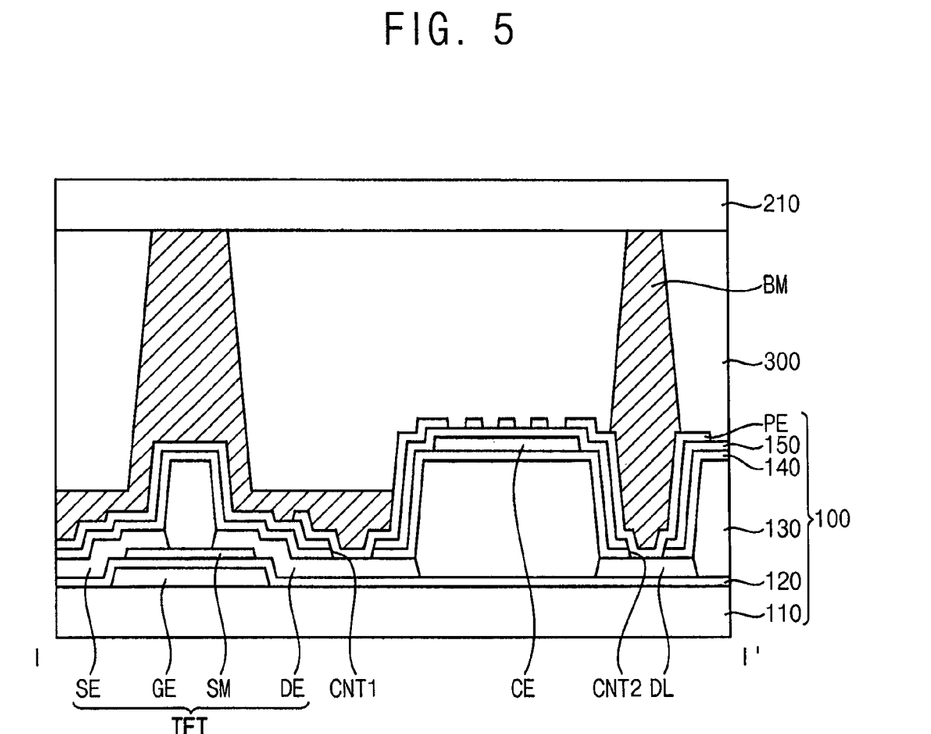
FIG. 5 is a cross-sectional view illustrating a display panel according to an example embodiment cut along line I-I' in FIG. 1.

FIG. 5 is a cross-sectional view illustrating a display panel according to an example embodiment cut along line I-I' in FIG. 1.

The display panel according to an example embodiment in FIG. 5 may be substantially the same as or similar to the display panel illustrated in FIG. 2, except that a black matrix BM is included in a first substrate 100. Thus, like reference numerals refer to like elements, and detailed descriptions thereon are omitted herein.

Referring to FIG. 5, the first substrate 100 includes a first base substrate 110, a gate insulation layer 120, a data pattern, a color filter CF, an organic pattern 130, a first passivation layer 140, a common electrode CE, a second passivation layer 150, a pixel electrode PE and a black matrix BM. The first substrate 100 may have a color filter on array (COA) structure (i.e., a color filter that is formed on an array substrate) and may have a black matrix on array (BOA) structure (i.e., a black matrix that is formed on an array substrate).

The black matrix BM may be disposed on the first base substrate 110, and the black matrix BM may block light.

The black matrix BM may be formed to correspond to a non-display area of a pixel, and the black matrix BM may block the light which is provided from outside.

For example, the black matrix BM may be formed on the gate line GL, the data line DL and the thin film transistor TFT to be overlapped by the black matrix BM.

For example, the black matrix BM may be formed to include black material including photosensitive organic material.

For example, the black matrix BM may include stain such as carbon black, organic/inorganic pigment, color (R, G and B) mix pigment, etc. to display black color.

For example, the black matrix BM may serve as a column spacer maintaining a cell gap between the first and second substrates 100 and 200.

The second substrate 200 may include a second base substrate 210.

The liquid crystal layer 300 may be disposed between the first and second substrates 100 and 200.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display panel comprising:
   a first substrate having a plurality of pixel areas;
   a second substrate facing the first substrate;
   a liquid crystal layer between the first and second substrates;
   a gate line extending along a first direction on the first substrate;
   a data line on the gate line, the data line extending along a second direction crossing the first direction;
   a thin film transistor connected to the gate line and the data line, the thin film transistor including a gate electrode, a semiconductor pattern, a source electrode and a drain electrode;
   an organic pattern making contact with a side surface of the data line and a side surface of the thin film transistor, the organic pattern overlapping the pixel areas;
   a first passivation layer on the data line, the thin film transistor and the organic pattern;
   a common electrode on the first passivation layer, the common electrode overlapping the pixel areas;
   a second passivation layer covering the common electrode; and
   a pixel electrode on the second passivation layer, the pixel electrode overlapping the common electrode, and the pixel electrode electrically connected to the drain electrode through a first contact hole and the data line through a second contact hole,
   wherein the first passivation layer is disposed between the organic pattern and the common electrode, and
   wherein the organic pattern does not overlap the data line, the source electrode, and the drain electrode in a thickness direction, and the first and second passivation layers cover the organic pattern.

2. The display panel of claim 1, wherein the organic pattern is further disposed on the semiconductor pattern and between the source electrode and the drain electrode spaced from the source electrode.

3. The display panel of claim 1, wherein the organic pattern may include a positive-type photosensitivity organic material.

4. The display panel of claim 1, wherein the pixel electrode has a slit pattern.

5. The display panel of claim 1, wherein the second contact hole is provided on the data line, and wherein a width of the second contact hole is less than a width of the data line.

6. The display panel of claim 5, wherein the width of the second contact hole is less than the width of the data line by about 1 μm.

7. The display panel of claim 1, further comprising:
   a color filter on the second substrate, the color filter overlapping the pixel areas; and
   a black matrix on the color filter, the black matrix overlapping the gate line, the data line and the thin film transistor.

8. The display panel of claim 1, further comprising:
   a color filter on the first substrate, the color filter overlapping the pixel areas; and
   a black matrix on the second substrate, the black matrix overlapping the gate line, the data line and the thin film transistor.

9. The display panel of claim 1, further comprising:
   a color filter on the first substrate, the color filter overlapping the pixel areas; and
   a black column spacer on the data line and the thin film transistor, the black column spacer maintaining a cell gap between the first and second substrates.

* * * * *